(12) United States Patent
Kaajakari

(10) Patent No.: US 11,624,613 B2
(45) Date of Patent: Apr. 11, 2023

(54) SYNCHRONIZED FOUR MASS GYROSCOPE

(71) Applicant: MURATA MANUFACTURING CO., LTD., Nagaokakyo (JP)

(72) Inventor: Ville Kaajakari, Helsinki (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/529,667

(22) Filed: Nov. 18, 2021

(65) Prior Publication Data

US 2022/0178693 A1 Jun. 9, 2022

(30) Foreign Application Priority Data

Dec. 3, 2020 (FI) ...................................... 20206246

(51) Int. Cl.
*G01C 19/574* (2012.01)

(52) U.S. Cl.
CPC .................................. *G01C 19/574* (2013.01)

(58) Field of Classification Search
None
See application file for complete search history.

(56) References Cited

U.S. PATENT DOCUMENTS

| | | | | |
|---|---|---|---|---|
| 10,330,476 B2* | 6/2019 | Shao | ................... | G01C 19/5621 |
| 10,415,968 B2 | 9/2019 | Prikhodko et al. | | |
| 10,627,235 B2* | 4/2020 | Prikhodko | ......... | G01C 19/5747 |
| 10,697,774 B2* | 6/2020 | Prikhodko | ........... | G01C 19/574 |
| 2010/0186506 A1 | 7/2010 | Robert | | |
| 2010/0218605 A1 | 9/2010 | Blomqvist et al. | | |
| 2010/0313657 A1* | 12/2010 | Trusov | ............... | G01C 19/5719 |
| | | | | 73/504.16 |
| 2015/0330783 A1* | 11/2015 | Rocchi | ............... | G01C 19/5769 |
| | | | | 73/504.12 |
| 2016/0231118 A1 | 8/2016 | Trusov et al. | | |
| 2018/0172446 A1 | 6/2018 | Prikhodko et al. | | |
| 2018/0172447 A1* | 6/2018 | Prikhodko | ......... | G01C 19/5747 |

OTHER PUBLICATIONS

Finnish Search Report dated Jun. 22, 2021 corresponding to Finnish Patent Application No. 20206246.
Sergei A. Zotov et al., "High-Range Angular Rate Sensor Based on Mechanical Frequency Modulation," Journal of Microelectromechanical Systems, vol. 21, No. 2, Apr. 2012, pp. 398-405.
European Search Report dated Apr. 8, 2022 corresponding to European Patent Application No. 21209754.

* cited by examiner

*Primary Examiner* — Paul M. West
*Assistant Examiner* — Mark A Shabman
(74) *Attorney, Agent, or Firm* — Squire Patton Boggs (US) LLP (57) ABSTRACT

A gyroscope which comprises first and second proof masses aligned on a first lateral axis, third and fourth proof masses are aligned on a second lateral axis, and central and peripheral anti-phase coupling structures which synchronize a first and a second oscillation mode in this four-mass system. Each central x-axis anti-phase structure and each central y-axis anti-phase structure comprises an in-plane seesaw with a central elongated bar which is suspended from at least one central anchor point with at least one central seesaw suspender which allows the central elongated bar to rotate in the device plane about an axis which is perpendicular to the device plane.

5 Claims, 9 Drawing Sheets

SYNCHRONIZED FOUR MASS GYROSCOPE

FIELD OF THE DISCLOSURE

This disclosure relates to microelectromechanical gyroscopes, and more particularly to z-axis gyroscopes where four proof masses oscillate in a device plane (the xy-plane) and a rotation rate is measured about an input axis (z-axis) which is perpendicular to that plane.

BACKGROUND OF THE DISCLOSURE

In microelectromechanical (MEMS) gyroscopes, proof masses should preferably be easily set to oscillate in a primary oscillation mode (which may also be called the drive oscillation mode). They should also easily undergo oscillation in a secondary oscillation mode (which may also be called the sense oscillation mode) induced by the Coriolis force. A general problem in gyroscope design is that the oscillation of proof masses in these two modes should preferably not be perturbed by external disturbances. A gyroscope should preferably be unperturbed by both linear and rotational vibrations so that its output signal is determined only by the angular rotation rate which the gyroscope undergoes in the intended frequency range. In automotive applications, for example, potential disturbances typically lie in the frequency range 0-50 kHz, while the input frequency range typically lies below 1 kHz.

A simple MEMS gyroscope may be constructed utilizing only one oscillating proof mass, but the output signal of such a gyroscope will typically be noisy when external vibrations are present at frequencies close to the operating frequency. One-mass gyroscopes would be practical only at operating frequencies above 50 kHz, but other disturbing effects, such as quadrature signals arising from manufacturing imperfections, often become very prominent at such frequencies.

It is known that a system where four proof masses oscillate in anti-phase can be made much more robust against vibrations than a one-mass gyroscope. Signal components arising from vibrations that induce cophasal movement in any pair of proof masses can in this system be automatically cancelled via differential measurements, at least to some degree. Furthermore, if the anti-phase oscillation of four proof masses is effectively synchronized, all cophasal resonant frequencies can be brought above 50 kHz without affecting the anti-phase resonant frequencies. The disturbing vibrations will then typically produce no resonance amplification, which greatly reduces their impact on the device.

MEMS gyroscopes which are designed to measure angular rotation rate about one axis which is perpendicular to the device substrate may be called z-axis gyroscopes. Since the Coriolis force in this case acts in the direction of the device plane, z-axis gyroscopes can be designed so that both the primary oscillation and the secondary oscillation of the proof masses occurs in the device plane.

U.S. Pat. No. 10,415,968 and the article Zotov et al, High-Range Angular Rate Sensor Based on Mechanical Frequency Modulation (Journal of Microelectromechanical Systems, Vol. 21, No. 2, p. 398-405, April 2012) disclose z-axis gyroscopes where four proof masses are coupled to each other with arrangements which promote anti-phase motion and resists in-phase motion. However, some of the synchronization and suspension arrangements used in these gyroscopes are based on clamped-clamped beam spring structures which are known to be nonlinear. Nonlinear springs limit the gyroscope mass vibration amplitude to a low level, which limits the accuracy and noise performance of the gyroscope.

BRIEF DESCRIPTION OF THE DISCLOSURE

An object of the present disclosure is to provide a four-mass gyroscope with anti-phase synchronization where the above problem has been alleviated.

The object of the disclosure is achieved by an arrangement which is characterized by what is stated in the independent claim. The preferred embodiments of the disclosure are disclosed in the dependent claims.

The disclosure is based on the idea of coupling every synchronization structure which transmits force in the x-direction to the corresponding proof mass with a coupling element which is rigid in the x-direction but flexible in the y-direction, and coupling every synchronization structure which transmits force in the y-direction to the corresponding proof mass with a coupling element which is rigid in the y-direction but flexible in the x-direction. The disclosure is further based on the idea of utilizing in-plane seesaw synchronization structures for central synchronization.

An advantage of this arrangement is that each proof mass can oscillate with a large amplitude, and the oscillation of each proof mass in the x-direction becomes independent of its oscillation in the y-direction, while still being synchronized with the oscillation of the other proof masses in both directions.

BRIEF DESCRIPTION OF THE DRAWINGS

In the following the disclosure will be described in greater detail by means of preferred embodiments with reference to the accompanying drawings, in which.

DETAILED DESCRIPTION OF THE DISCLOSURE

This disclosure describes a gyroscope which comprises a device plane where a first and a second lateral axis cross a first and a second transversal axis orthogonally. The gyroscope also comprises first, second, third and fourth proof masses. The first and second proof masses are aligned on the first lateral axis, the third and fourth proof masses are aligned on the second lateral axis, the first and third proof masses are aligned on the first transversal axis and the second and fourth proof masses are aligned on the second transversal axis.

The first and second proof masses are coupled to each other with a first central x-axis anti-phase coupling structure which flexibly allows the simultaneous movement of the first and second proof masses in opposite lateral directions but rigidly resists the simultaneous movement of the first and second proof masses in the same lateral direction.

The third and fourth proof masses are coupled to each other with a second central x-axis anti-phase coupling structure which flexibly allows the simultaneous movement of the third and fourth proof masses in opposite lateral directions but rigidly resists the simultaneous movement of the third and fourth proof masses in the same lateral direction.

The first and third proof masses are coupled to each other with a first central y-axis anti-phase coupling structure which flexibly allows the simultaneous movement of the first and third proof masses in opposite transversal directions but rigidly resists the simultaneous movement of the first and third proof masses in the same transversal direction.

The second and fourth proof masses are coupled to each other with a second central y-axis anti-phase coupling structure which flexibly allows the simultaneous movement of the second and fourth proof masses in opposite transversal directions but rigidly resists the simultaneous movement of the second and fourth proof masses in the same transversal direction.

The first and second proof masses are coupled to each other with a first peripheral y-axis anti-phase coupling structure which flexibly allows simultaneous movement of the first and second proof masses in opposite transversal directions but rigidly resists the simultaneous movement of the first and second proof masses in the same transversal direction.

The third and fourth proof masses are coupled to each other with a second peripheral y-axis anti-phase coupling structure which flexibly allows simultaneous movement of the third and fourth proof masses in opposite transversal directions but rigidly resists the simultaneous movement of the third and fourth proof masses in the same transversal direction.

The first and third proof masses are coupled to each other with a first peripheral x-axis anti-phase coupling structure which flexibly allows simultaneous movement of the first and third proof masses in opposite lateral directions but rigidly resists the simultaneous movement of the first and third proof masses in the same lateral direction.

The second and fourth proof masses are coupled to each other with a second peripheral x-axis anti-phase coupling structure which flexibly allows simultaneous movement of the second and fourth proof masses in opposite lateral directions, but rigidly resists the simultaneous movement of the second and fourth proof masses in the same lateral direction.

The gyroscope further comprises a set of first anchor points adjacent to the first proof mass, a set of second anchor points adjacent to the second proof mass, a set of third anchor points adjacent to the third proof mass and a set of fourth anchor points adjacent to the fourth proof mass, and each of the first, second, third and fourth proof masses is suspended from the corresponding set of first, second, third and fourth anchor points by one or more suspension structures.

Each central and peripheral x-axis anti-phase coupling structure is coupled to the corresponding proof masses with an x-axis coupling element which is flexible in the transversal direction and stiff in the lateral direction. Each central and peripheral y-axis anti-phase coupling structure is coupled to the corresponding proof masses with a y-axis coupling element which is flexible in the lateral direction and stiff in the transversal direction.

Each central x-axis anti-phase structure and each central y-axis anti-phase structure comprises an in-plane seesaw with a central elongated bar which is suspended from at least one central anchor point with at least one central seesaw suspender which allows the central elongated bar to rotate in the device plane about an axis which is perpendicular to the device plane.

In this disclosure the device plane is illustrated and referred to as the xy-plane. The x-direction is referred to as the lateral direction and the y-direction as the transversal direction. The device plane may also be called the horizontal plane. The z-axis is perpendicular to the xy-plane. It may also be called the vertical axis. Linear and/or rotational motion where the proof mass remains level in the device plane when it moves away from its rest position is referred to as "in-plane" motion or "motion in the device plane".

In this disclosure, the words "horizontal" and "vertical" refer to the device plane and a direction perpendicular to the device plane, respectively. The device plane is typically defined by the substrate in which the micromechanical structures are prepared. The words "horizontal" and "vertical" do not imply anything about how the device should be oriented during manufacture or usage.

Expressions such as "aligned on the first lateral axis", refer to the placement of device elements so that the said axis substantially crosses the midpoint of said device element. The proof mass may for example be symmetric in relation to said axis and/or the axis may cross the center of gravity of said proof mass. However, perfect alignment is not necessarily always needed.

In this disclosure, the term "spring" refers to a device part which is flexible in at least one direction. The term "suspender" or "suspension element" refers to an element which is placed (possibly together with other device parts) between a fixed part (such as an anchor point) and a device part which moves when the device is operated. The term "suspension structure" refers to a more combination of suspenders which together provide structural support to the mobile masses. A suspension structure may contain suspenders which are connected to each other in a concatenated manner. Some of the suspenders may be rigid, others flexible. Suspension structures include at least one flexible suspender which provides the flexibility needed for accommodating the desired oscillation.

The suspension structures provide structural support for the proof masses. As described in more detail below, the first, second, third and fourth proof masses may (but do not necessarily have to) be coupled to each other via their suspension structures. In other words, the central and peripheral coupling structures may extend between the suspension structures of two proof masses aligned on the same axis. Alternatively, the central and peripheral coupling structures may extend between two proof masses aligned on the same axis and the suspension structures may be separate structures which do not lie between the coupling structures and the proof masses.

The central and peripheral anti-phase coupling structures synchronize both the lateral and the transversal oscillating motion of the proof masses in the manner described above. Throughout this disclosure, the term "synchronize", and phrases such as "structure A synchronizes oscillation mode X", have the following meaning. Structure A constitutes a mechanical connection in a system of interconnected mass elements which should preferably oscillate in the desired mode X, but preferably not in an undesired mode Y. Structure A exhibits a beneficial combination of rigidity and flexibility, so that the presence of structure A improves the relationship between the resonance frequency $F_X$ of mode X and the resonance frequency $F_Y$ of mode Y in the system.

The presence of structure A may, for example, increase the ratio $F_Y/F_X$ and/or the difference $F_Y-F_X$. The reference state against which this improvement is measured may in some cases be the same system of mass elements without structure A. Structure A is in this case needed only for synchronization. In other cases, when structure A is also needed for supporting the weight of the mass elements, the reference state against which the synchronization improvement is measured may be the same system of mass elements where A has been replaced with an alternative structure B which only gives structural support.

In general, all suspension, synchronization and coupling arrangements are optimized for support and for flexibility in certain directions and rigidity in other directions. These three variables may conflict with each other, so their optimization often means that a good compromise solution should be found. All elements of the gyroscope may influence these compromises.

Figure 1A:
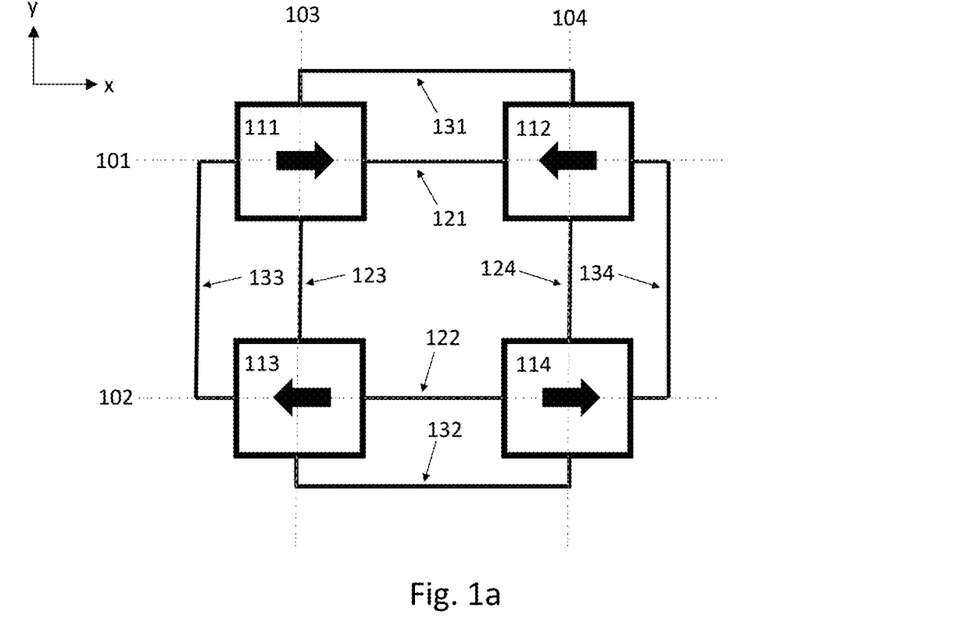
FIGS. 1a-1d illustrate desired an undesired lateral oscillation in a four-mass gyroscope.

FIG. 1a illustrates schematically with solid black arrows a first oscillation mode which is a desired oscillation mode in the gyroscope described in this disclosure. FIG. 1a illustrates a first (101) and a second (102) lateral axis, a first (103) and a second (104) transversal axis and first (111), second (112), third (113) and fourth (114) proof masses. FIG. 1a also illustrates schematically a first central x-axis anti-phase coupling structure 121, a second central x-axis anti-phase coupling structure 122, a first central y-axis anti-phase coupling structure 123, a second central y-axis anti-phase coupling structure 124, a first peripheral y-axis anti-phase coupling structure 131, a second peripheral y-axis anti-phase coupling structure 132, a first peripheral x-axis anti-phase coupling structure 133 and a second peripheral x-axis anti-phase coupling structure 134.

The central and peripheral x-axis anti-phase coupling structures 121-122 and 133-134 promote the first oscillation mode where masses 111 and 112 move towards each other on the first lateral axis 101 as masses 113 and 114 simultaneously move away from each other on the second lateral axis 102. In the opposite half of the oscillation cycle, masses 111 and 112 move away from each other while masses 113 and 114 move towards each other.

Figure 1B:
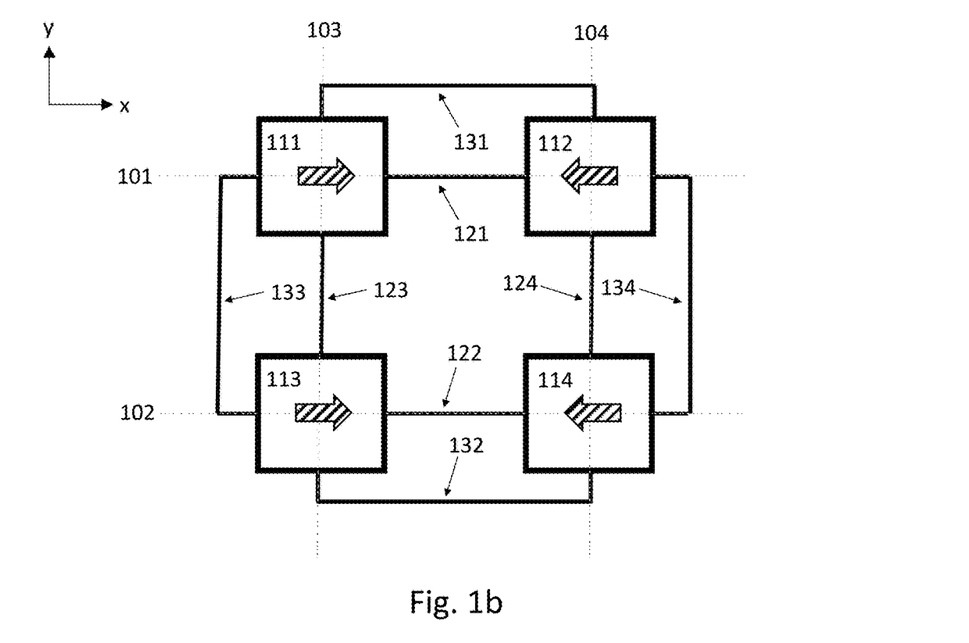
Figure 1C:
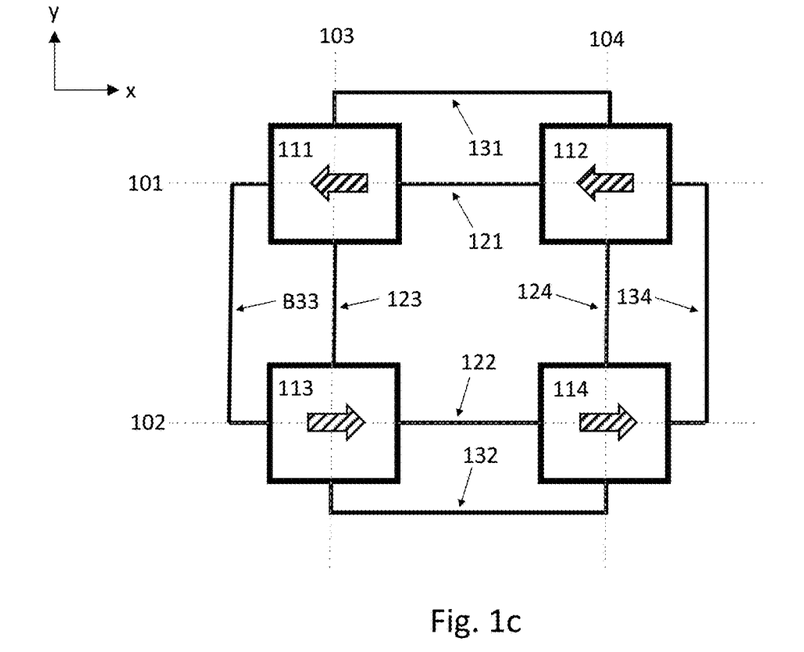
Figure 1D:
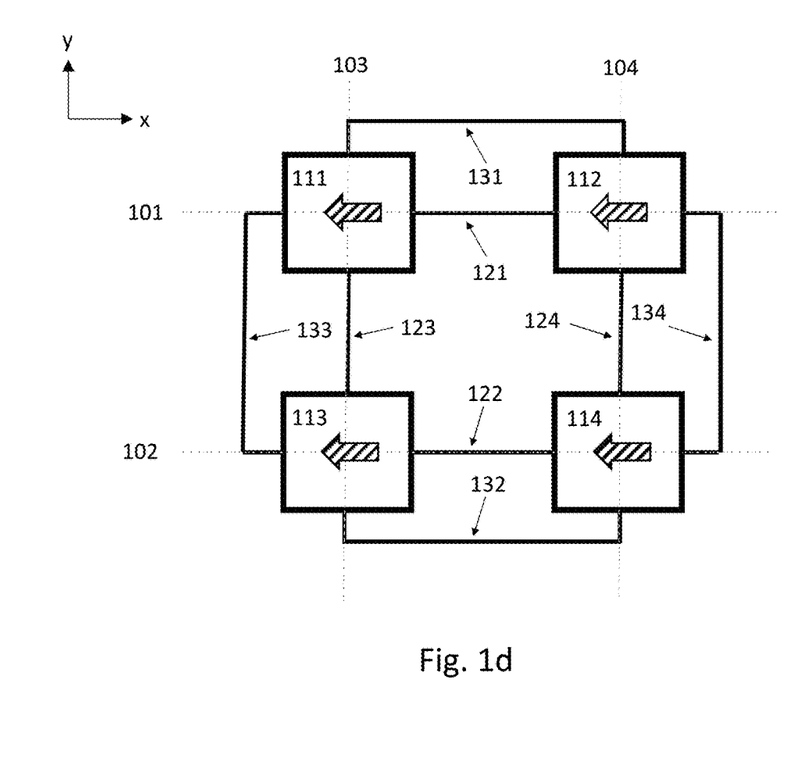

FIGS. 1b, 1c and 1d illustrate with patterned arrows three undesired oscillation modes where cophasal oscillation occurs. The peripheral x-axis anti-phase coupling structures 133-134 resist the cophasal oscillation shown in FIG. 1b where both proof mass pairs 111+112 and 113+114 oscillate towards each other at the same time. The central x-axis anti-phase coupling structures 121-122 resist the cophasal oscillation shown in FIG. 1c, which can be induced by angular acceleration. Proof masses 111 and 112 move simultaneously in one lateral direction while 113 and 114 move simultaneously in the other lateral direction. And finally, both the central 121-122 and peripheral 133-134 coupling structures resist the cophasal oscillation induced by linear acceleration in FIG. 1d, where all four proof masses 111-114 move in the same direction.

Figure 2A:
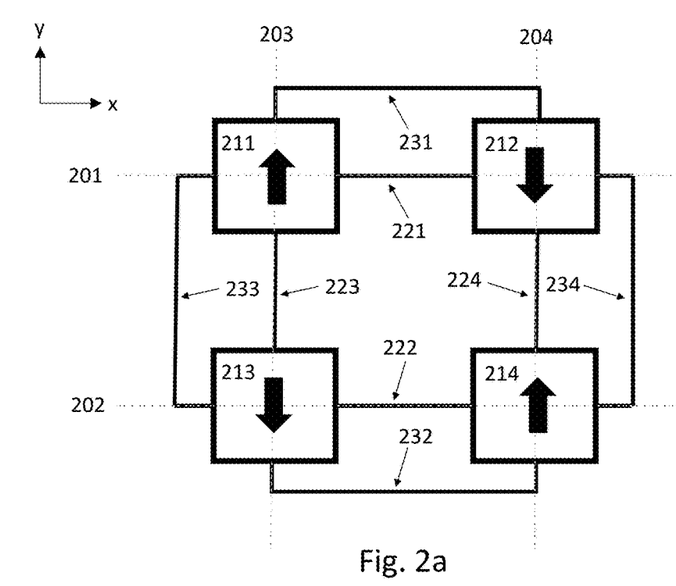
FIGS. 2a-2d illustrate desired an undesired transversal oscillation in a four-mass gyroscope.

FIG. 2a illustrates schematically with solid arrows a second oscillation mode which is a desired oscillation mode. Reference numbers 201-204, 211-214, 221-224 and 231-234 correspond to reference numbers 101-104, 111-114, 121-124 and 131-134, respectively, in FIGS. 1a-1c.

The central and peripheral y-axis anti-phase coupling structures 223-224 and 231-232 promote the second oscillation mode where masses 211 and 213 move away from each other on the first transversal axis 203 as masses 212 and 214 simultaneously move towards each other on the second transversal axis 204. In the opposite half of the oscillation cycle, masses 211 and 213 move towards each other while masses 212 and 214 move away from each other.

Figure 2B:
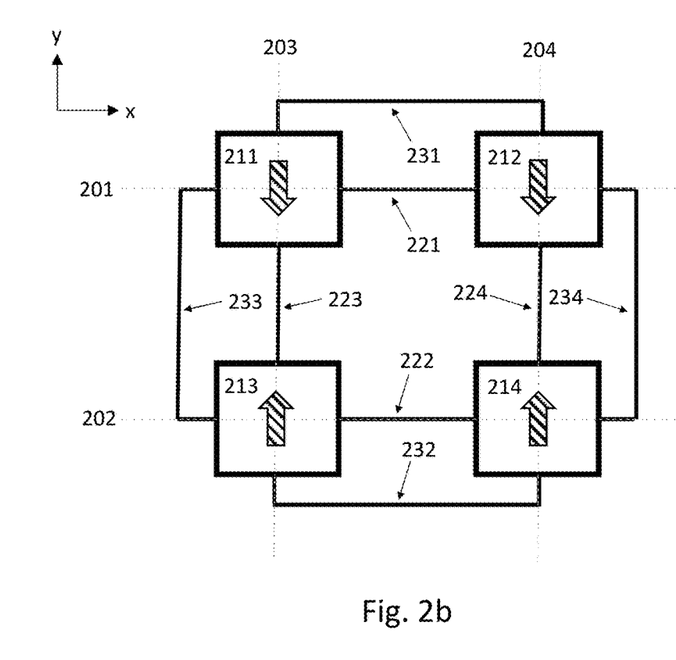
Figure 2C:
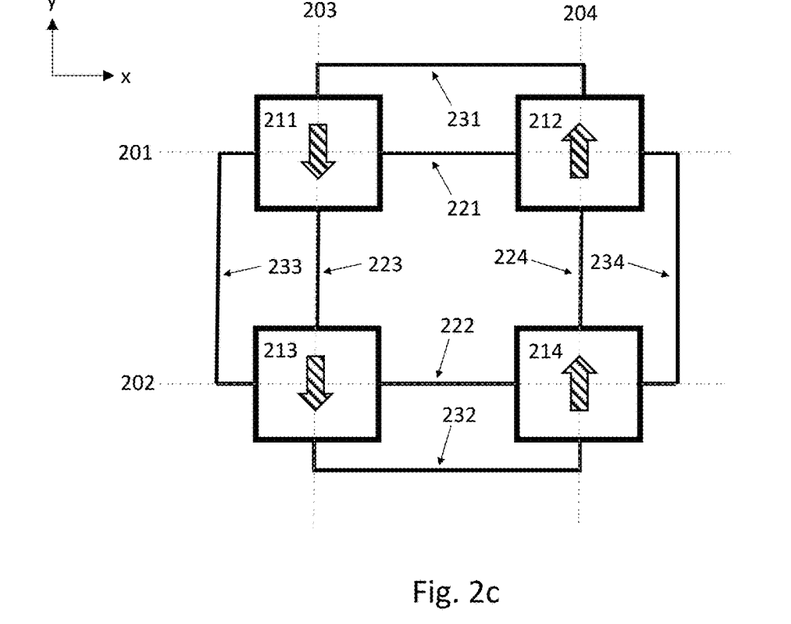
Figure 2D:
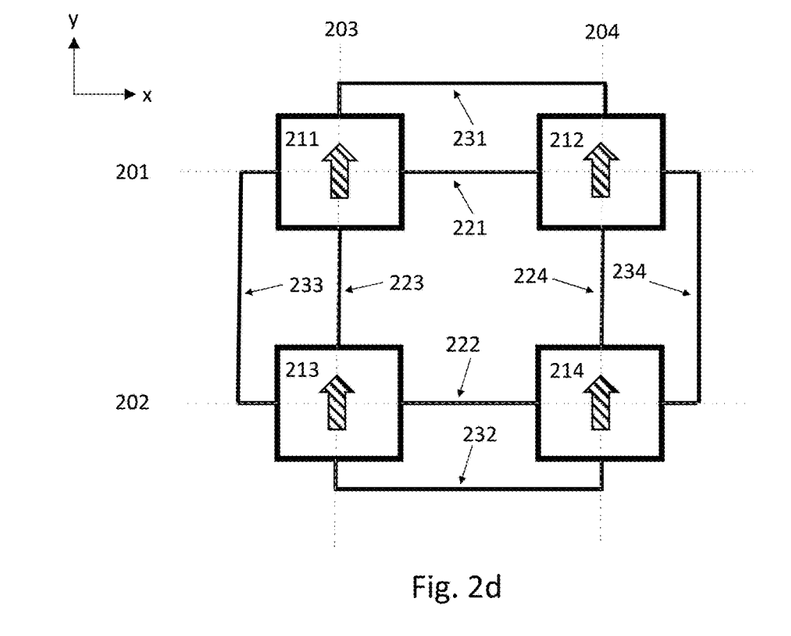
Figure 3A:
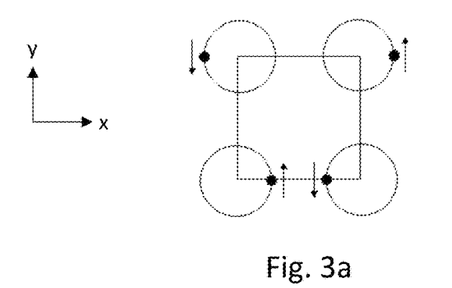
FIGS. 3a-3d illustrate the movement of the center of mass in different phases of the oscillation cycle.
Figure 3B:
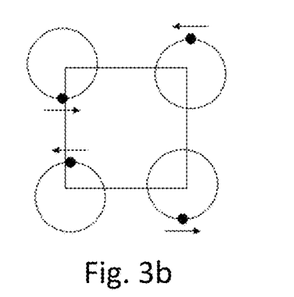
Figure 3C:
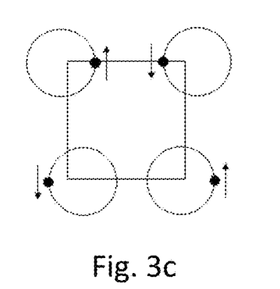
Figure 3D:
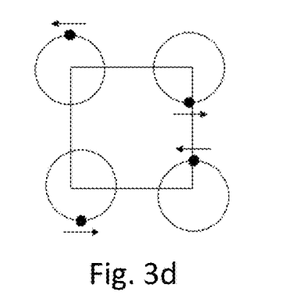

FIGS. 2b, 2c and 2d illustrate three undesired oscillation modes with cophasal oscillation. The peripheral y-axis anti-phase coupling structures 231-232 resist the cophasal oscillation shown in FIG. 2b where both proof mass pairs 211+213 and 212+214 oscillate towards each other at the same time. The central y-axis anti-phase coupling structures 223-224 resist the cophasal oscillation shown in FIG. 2c, which can be induced by angular acceleration. Proof masses 211 and 213 move simultaneously in one transversal direction while 212 and 214 move simultaneously in the other transversal direction. And finally, both the central 223-224 and peripheral 231-232 coupling structures resist the cophasal oscillation induced by linear acceleration in FIG. 2d, where all four proof masses 211-214 move in the same direction.

When the central (121, 122, 221, 222) and peripheral (133, 134, 233, 234) x-axis anti-phase coupling structures are coupled to the corresponding proof masses (111-114, 211-214) with x-axis coupling elements which are flexible in the transversal direction and stiff in the lateral direction, each x-axis coupling element will transmit force only in the lateral direction and dissipate forces which act in direction. Correspondingly, when the central (123, 124, 223, 224) and peripheral (131, 132, 231, 232) y-axis anti-phase coupling structures are coupled to the corresponding proof masses (111-114, 211-214) with y-axis coupling elements which are flexible in the lateral direction and stiff in the transversal direction, each y-axis coupling element will transmit force only in the transversal direction and dissipate forces which act in the lateral direction.

The technical purpose of all central and peripheral x-axis anti-phase coupling structures described in this disclosure is to increase the resonance frequency of undesired oscillation modes, such as the ones shown in FIGS. 1b-1c. Similarly, the central and peripheral y-axis anti-phase coupling structures described in this disclosure increase the resonance frequency of undesired oscillation modes, such as the ones shown in FIGS. 2b-2c.

The benefit of the coupling arrangements described in this disclosure is that the first and second oscillation modes can be synchronized effectively while still remaining independent of each other in each proof mass. The central and peripheral x-axis coupling between the proof masses (111-114, 211-214) promotes the first oscillation mode shown in FIG. 1a and resists the undesired oscillation modes shown in FIGS. 1b-1c. The y-axis coupling between the proof masses (111-114, 211-214) promotes the second oscillation mode shown in FIG. 2a and resists the undesired oscillation modes shown in FIGS. 2b and 2c. The proof mass system thereby obtains robust first and second oscillation modes which are not easily disturbed by external vibrations, and the oscillation of each proof mass in the first oscillation mode occurs independently of its oscillation in the second oscillation mode.

The first and second oscillation modes can be made independent of each other particularly effectively with central x-axis anti-phase structures and central y-axis anti-phase structures which comprise an in-plane seesaw with a central elongated bar which is suspended from at least one central anchor point with at least one central seesaw suspender which allows the central elongated bar to rotate in the device plane about an axis which is perpendicular to the device plane. This is because each central elongated bar which synchronizes the movement of proof masses in the lateral/transversal direction can easily be joined to coupling elements which are rigid in the same (lateral/transversal) direction but flexible in the orthogonal (transversal/lateral) direction. The seesaw structure has mainly a mass loading effect on desired anti-phase motion, which lowers the anti-phase motion resonance frequency. In-phase motion would require deformation of the seesaw, which raises the in-phase resonance frequency. The combined effect separates anti-phase and in-phase resonance frequencies, with the desired anti-phase motion having the lowest resonance frequency.

The gyroscope may be operated as an amplitude-modulated gyroscope where the drive transducers actuate the proof masses 111-114/211-214 into a primary oscillation mode which corresponds to the first oscillation mode shown in FIG. 1a. The primary oscillation has a predetermined amplitude which is kept as constant as possible. When the gyroscope undergoes angular rotation, the Coriolis force sets the proof masses to oscillate also in a secondary oscillation mode which corresponds to the second oscillation mode shown in FIG. 2a. The amplitude of the secondary oscillation is proportional to the angular rotation rate and to the amplitude of the primary oscillation. This amplitude can be measured with sense transducers which are configured to generate a sense signal which is proportional to the transversal displacement of a proof mass. Disturbances generated by external vibrations can be effectively cancelled with a differential readout where sense signals measured from proof masses moving in opposite directions are subtracted from each other.

The gyroscope may alternatively be operated as a frequency-modulated gyroscope where the drive transducers actuate proof masses 111-114/211-214 simultaneously into both the first and the second oscillation modes. The oscillation amplitude may be substantially the same in the first and the second oscillation mode, so that the drive transducers actuate each proof mass into substantially circular movement. This movement is illustrated in FIGS. 3a-3d, each of which illustrates a phase in the oscillation cycle. The center of mass of each proof mass is illustrated with a dot, and the placements of these dots illustrates how the circular movement of each proof mass can be synchronized with that of the other proof masses.

The direction and oscillation and oscillation frequency of the circular motion is the same for each proof mass. When the gyroscope undergoes angular rotation, the Coriolis force either reduces or increases the oscillation frequency of the circular motion.

It is also possible to operate the gyroscope in Lissajous mode pattern if the first and second oscillation modes have slightly different resonance frequencies.

The primary benefit of a synchronized four mass design is the insensitivity to acceleration effects. This robustness is achieved by two means: First, the acceleration results in in-phase mass movement which is mechanically inhibited by the coupling structures. Second, the mass displacement is measured differentially from four masses. The sense transducers are configured to combine anti-phase movement while in-phase movement cancels in the differential sensing.

If the gyroscope is operated as an amplitude-modulated gyroscope, the independence of the first and second oscillation modes means that the high-amplitude drive oscillation will not cause false measurement signals in the low-amplitude sense oscillation mode. If the gyroscope is operated as a frequency-modulated gyroscope, the independence of the first and second oscillation modes means that the proof masses can reliably be driven in a circular or Lissajous pattern which is particularly suitable for reliable frequency measurements.

Figure 4A:
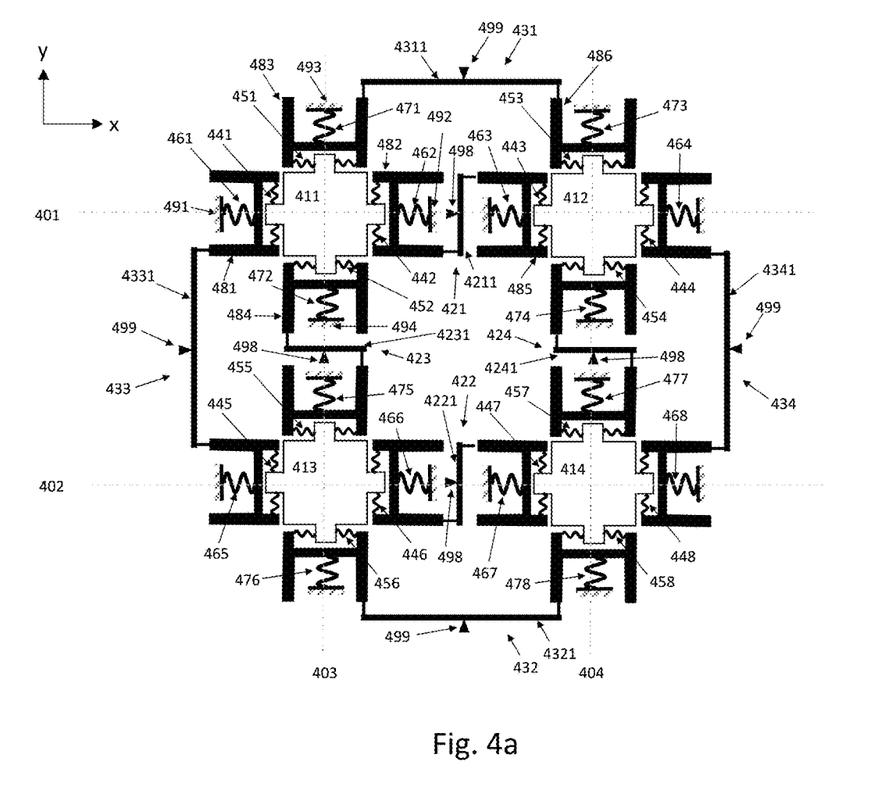
FIGS. 4a-4c illustrate a four-mass gyroscope with suspension and synchronization structures outside of the proof masses.

FIG. 4a illustrates a gyroscope where reference numbers 401-404, 411-414, 421-424 and 431-434 correspond to reference numbers 101-104, 111-114, 121-124 and 131-134, respectively, in FIGS. 1a-1c. FIG. 4a also illustrates a set of first anchor points 491-494 adjacent to the first proof mass 411 and corresponding sets of anchor points adjacent to each of the other three proof masses. FIG. 4a also illustrates x-axis coupling elements 441-448 and y-axis coupling elements 451-458.

In the illustrated gyroscope, the set of first anchor points consists of four first anchor points placed symmetrically around the first proof mass, the set of second anchor points consists of four second anchor points placed symmetrically around the second proof mass, the set of third anchor points consists of four third anchor points placed symmetrically around the third proof mass, and the set of fourth anchor points consists of four fourth anchor points placed symmetrically around the fourth proof mass.

Each of the one or more suspension structures which suspend the first, second, third and fourth proof masses from the corresponding set of first, second, third and fourth anchor points comprise two x-axis suspension structures on laterally opposite sides of the corresponding proof mass. Each x-axis suspension structure comprises one of said x-axis coupling elements and an x-axis suspension spring which is flexible in the lateral direction. Each of the one or more suspension structures which suspend the first, second, third and fourth proof masses from the corresponding set of first, second, third and fourth anchor points also comprise two y-axis suspension structures on transversally opposite sides of the proof mass. Each y-axis suspension structure comprises one of said y-axis coupling elements and a y-axis suspension spring which is flexible in the transversal direction.

Figure 4B:
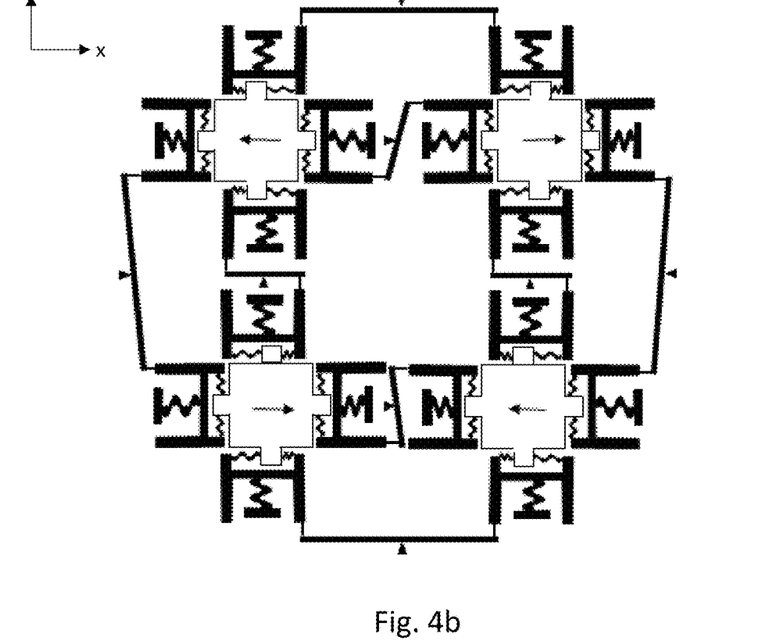
Figure 4C:
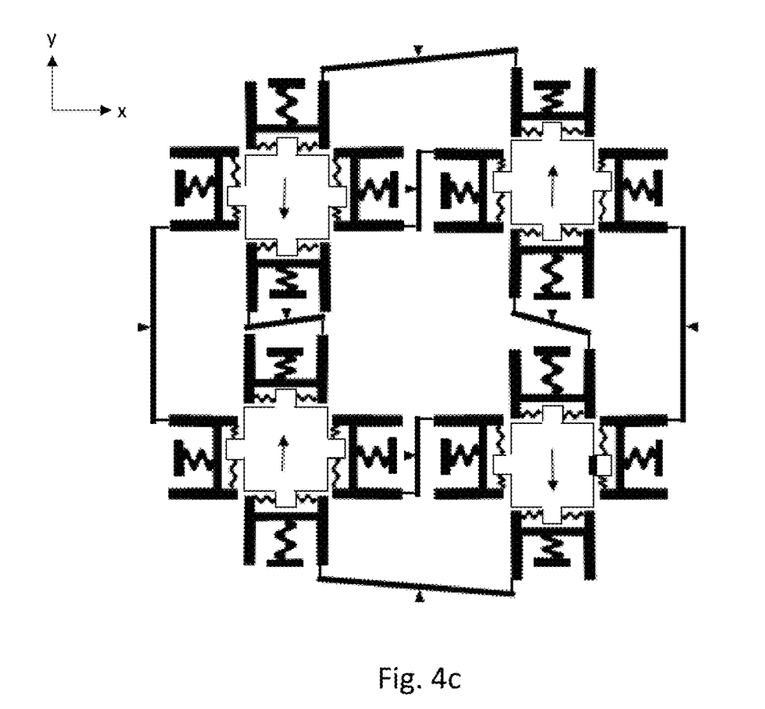

In other words, in FIGS. 4a-4c the x-axis and y-axis coupling elements form a part of the suspension structures which suspend the proof mass from the corresponding set of anchor points and support the weight of the proof mass. The central and peripheral anti-phase coupling structures are in this example connected to lateral and transversal extension elements (481-484) which form a part of the suspension structures.

The one or more suspension structures which suspend the first proof mass 411 from the corresponding set of anchor points (491-494) in FIG. 4a comprise two x-axis suspension structures and two-y-axis suspension structures. The x-axis suspension structures comprise an x-axis suspension spring (461, 462) which is flexible in the lateral direction but stiff in the transversal direction. In FIG. 4a these x-axis suspension springs (461, 462) lie on laterally opposite sides of the corresponding proof mass (411), but this is not a necessary feature in all embodiments. Each x-axis suspension spring extends from the corresponding anchor point (491, 492) to a corresponding lateral extension element (481, 482). The two anchor points (491, 492) where the x-axis main springs (461, 462) are connected may, but do not necessarily have to, lie on laterally opposite sides of the corresponding proof mass (411). Similarly, the lateral extension elements (481, 482) where the x-axis main springs are connected may, but do not necessarily have to, lie on laterally opposite sides of the corresponding proof mass. The lateral extension elements may be stiff both in the lateral and in the transversal direction.

The y-axis suspension structures which suspend the proof mass 411 comprise a y-axis suspension spring (471, 472) which is flexible in the transversal direction but stiff in the lateral direction. These y-axis suspension springs (471, 472) lie on transversally opposite sides of the corresponding proof mass (411), but this is not a necessary feature in all embodiments. Each y-axis suspension spring extends from the corresponding anchor point (493, 494) to a corresponding transversal extension element (483, 484). The two anchor points (493, 494) where the y-axis main springs (471, 472) are connected may, but do not necessarily have to, lie on transversally opposite sides of the corresponding proof mass (411). Similarly, the transversal extension elements (483, 484) where the y-axis main springs are connected may, but do not necessarily have to, lie on transversally opposite sides of the corresponding proof mass (411). The transversal extension elements may be stiff both in the lateral and in the transversal direction. These considerations on the x-axis and y-axis suspension structures apply to all proof masses 411-414 illustrated in FIG. 4a.

The technical benefit of the suspension structures illustrated in FIG. 4a, where each x-axis suspension structure is laterally flexible but transversally stiff, and each y-axis suspension structure is transversally flexible but laterally stiff, is that the first oscillation mode, shown in FIG. 1a, is not coupled to the second oscillation mode, shown in FIG. 2a, via the suspension structures, either. The proof masses are thereby suspended from the anchor points in a manner which allows the first oscillation mode to remain independent of the second oscillation mode. As mentioned before, this facilitates an accurate measurement of the sense oscillation mode in an amplitude-modulated gyroscope and circular or Lissajous drive oscillation in frequency-modulated gyroscopes.

In FIG. 4a, each central x-axis anti-phase structure (421, 422) and each central y-axis anti-phase structure (423, 424) comprises an in-plane seesaw with a central elongated bar which is suspended from at least one central anchor point with at least one central seesaw suspender which allows the central elongated bar to rotate in the device plane about an axis which is perpendicular to the device plane. Each peripheral x-axis anti-phase structure (433, 434) and each peripheral y-axis anti-phase structure (431, 432) also comprises an in-plane seesaw with a peripheral elongated bar which is suspended from at least one peripheral anchor point with at least one peripheral seesaw suspender which allows the peripheral elongated bar to rotate in the device plane about an axis which is perpendicular to the device plane. However, alternative peripheral anti-phase structures, which are not in-plane seesaws, could also be used.

FIG. 4a illustrates with reference number 499 each peripheral seesaw suspender-peripheral anchor point pair. The peripheral elongated bars which are suspended from the peripheral anchor point are indicated with numbers 4311, 4321, 4331 and 4341. FIG. 4a also illustrates with reference number 498 each central seesaw suspender-central anchor point pair. The central elongated bars which are suspended from the central anchor points are indicated with numbers 4211, 4221, 4231 and 4241. Each peripheral and central seesaw suspender may be any kind of spring system which allows the suspended bar to rotate in the device plane in the manner which is illustrated in FIGS. 4b and 4c below.

FIG. 4b, where all parts correspond to the parts numbered in FIG. 4a, shows the synchronizing action of the central and peripheral x-axis anti-phase structures in the first oscillation mode. It also shows how the y-axis coupling elements, some of which have been marked in FIG. 4a with reference numbers 451-458, flexible absorb the motion of the proof masses in the first oscillation mode so that little kinetic energy is transferred in this oscillation mode to the transversal extension elements (such as 483, 484) and onward to the y-axis suspension structures and y-axis anti-phase structures. The y-axis coupling elements are in this case springs which extend from the transversal extension elements (483, 484) to two sides of a protrusion in the corresponding proof mass (411). The transversal extension elements (483, 484) have been dimensioned to facilitate this two-sided attachment. However, the y-axis coupling elements may be any kind of spring arrangement which generates the previously described combination of flexibility and rigidity between the anti-phase coupling structures and the proof masses. These considerations apply also to the x-axis coupling elements such as 441-448 and to the lateral extension elements (481, 482).

FIG. 4c, where all illustrated parts again correspond to the parts numbered in FIG. 4a, shows the synchronizing action of the central and peripheral y-axis anti-phase structures in the second oscillation mode. It also shows how the x-axis coupling elements, some of which have been marked in FIG. 4b with reference numbers 441-448, flexibly absorb the motion of the proof masses in the second oscillation mode so that little kinetic energy is transferred in this oscillation mode to the lateral extension elements (such as 481, 482) and onward to the x-axis suspension structures and x-axis anti-phase structures.

Figure 5:
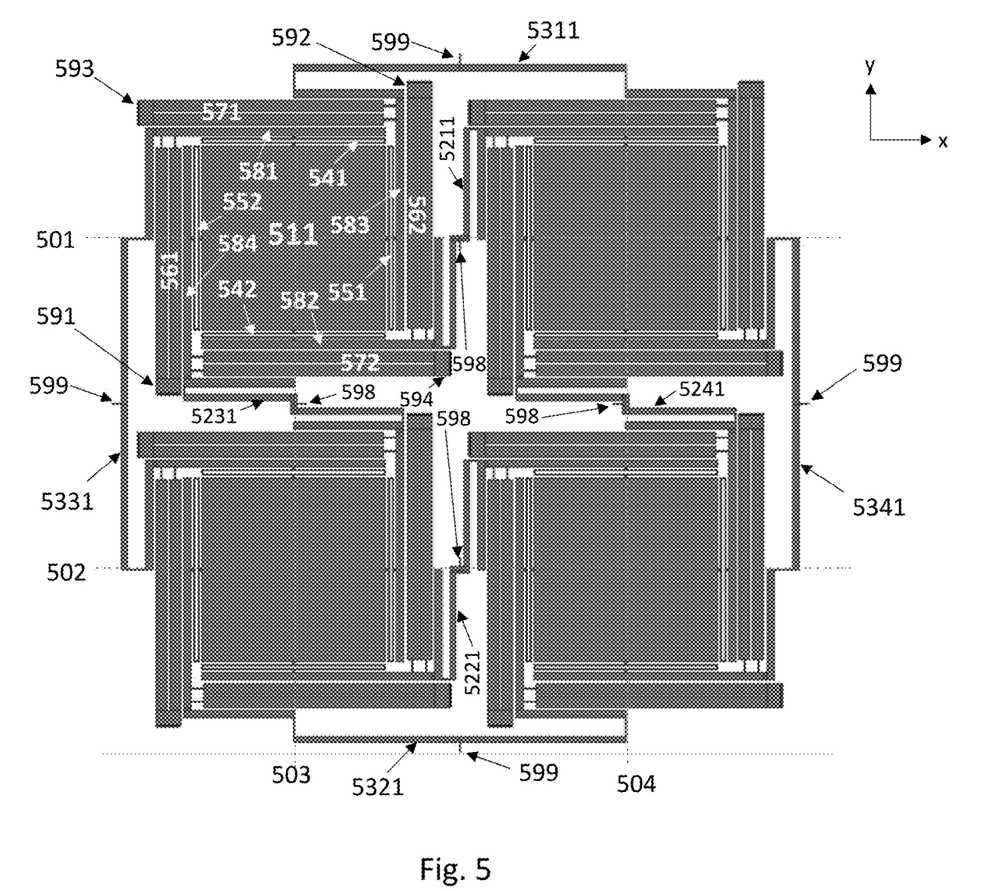
FIG. 5 illustrates a gyroscope which can be driven with piezoelectric transducers.

FIG. 5 illustrates a gyroscope which can be driven with piezoelectric transducers. Reference numbers 501-504, 511, 5211-5241, 5311-5341, 541-542, 551-552, 561-562, 571-572, 581-584, 591-594 and 598-599 correspond to reference numbers 401-404, 411, 4211-4241, 4311-4341, 441-442, 451-452, 461-462, 471-472, 481-484, 491-494 and 498-499.

The x-axis suspension springs 561-562 extend in a transversal direction from the corresponding first anchor points 591-592 along the laterally opposing sides of the proof mass. The y-axis suspension springs 571-572, on the other hand, extend in a lateral direction from the corresponding first anchor points 593-594 along the transversally opposing sides of the proof mass. It can be seen in FIG. 5 that the first anchor points 591-592 do not in this case have to be aligned on the first lateral axis 501, and first anchor points 593-594 do not have to be aligned on the first transversal axis 503. There may be one or more parallel x-axis/y-axis suspension springs on each side of the proof mass. FIG. 5 illustrates a device with two x-axis/y-axis suspension springs on each side.

Piezoelectric transducers can be built on the x-axis and y-axis suspension springs 561-562 and 571-572. These transducers can be used to bend these suspension springs in the device plane to generate driving forces in the lateral and transversal directions, or they can be used to measure the movement of the proof mass 511 in the lateral and transversal directions.

Each of the one or more suspension structures may comprise at least one piezoelectric transducer on an x-axis suspension spring and at least one piezoelectric transducer on a y-axis suspension spring.

The lateral extension elements 581-582 are in this case stiff bars which extend in the lateral direction along the transversally opposing sides of the proof mass. They transmit lateral forces between the x-axis suspension springs 561-562 and the proof mass 511. Similarly, the transversal extension elements 583-584 are stiff bars which extend in the transversal direction along the laterally opposing sides of the proof mass. They transmit transversal forces between the y-axis suspension springs 571-572 and the proof mass 511.

The x-axis (561-562) and y-axis (571-572) suspension springs may be attached to the corresponding lateral/transversal suspension springs (581-584) with flexures, illustrated in FIG. 5 as a short, narrow bar. The flexibility which these flexures provide at the attachment point will allow the x-axis and y-axis suspension springs to bend as a cantilever springs with uniform curvature along substantially the full length of the spring. The x-axis and y-axis suspension springs would bend into an S-type shape if they would be clamped with a fixed attachment at both ends.

Each lateral extension element (581-582) may be attached to the proof mass with one or more x-axis coupling elements (541-542). Each transversal extension element (583-584) may be attached to the proof mass with one or more y-axis coupling elements (551-552). The x-axis coupling elements may for example be box springs which are configured to be flexible in the transversal direction, and the y-axis coupling elements may be box springs which are configured to be flexible in the lateral direction.

Each peripheral elongated bar (5311, 321, 5331, 5341) may be coupled to the corresponding proof mass via the lateral/transversal extension elements (581-584) which surround the proof mass. Similarly, each central elongated bar (5211, 221, 5231, 5241) may be coupled to the corresponding proof mass via the lateral/transversal extension elements (581-584).

Figure 6:
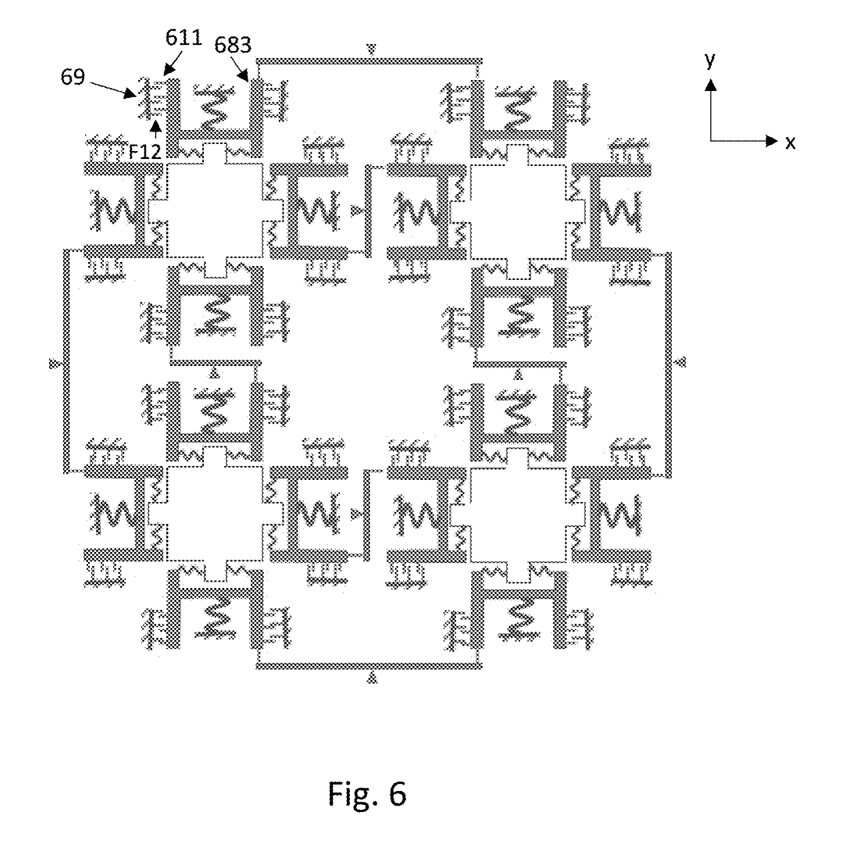
FIG. 6 illustrates schematically a gyroscope can be driven with capacitive force transducers.

FIG. 6 illustrates how the gyroscope can be driven with capacitive force transducers. The illustrated device parts correspond to the device parts illustrated in FIG. 4a. The additional device parts shown FIG. 6 include force transducers which comprise a set of rotor finger electrodes (such as 611) interdigitated with a set of stator finger electrodes (such as 612) Each set of rotor finger electrodes 611 is attached to a mobile device part, such as the transversal extension element 683. Each set of stator finger electrodes 612 is attached to an adjacent fixed structure. The force transducer 611+612, and other force transducers attached transversal extension elements, can actuate proof mass motion in the transversal direction and/or measure the movement of the adjacent proof mass in the transversal direction. The force transducers which are attached to lateral extension elements can actuate proof mass motion in the lateral direction and/or measure the movement of the adjacent proof mass in the lateral direction.

As in FIGS. 4a and 5, the set of first anchor points in FIG. 6 consists of four first anchor points placed symmetrically around the first proof mass, the set of second anchor points consists of four second anchor points placed symmetrically around the second proof mass, the set of third anchor points consists of four third anchor points placed symmetrically around the third proof mass, and the set of fourth anchor points consists of four fourth anchor points placed symmetrically around the fourth proof mass.

Each of the one or more suspension structures in FIG. 6 which suspend the first, second, third and fourth proof masses from the corresponding set of first, second, third and fourth anchor points comprise two x-axis suspension structures on laterally opposite sides of the corresponding proof mass. Each x-axis suspension structure comprises one of said x-axis coupling elements (441, 442) and an x-axis suspension spring (461, 462) which is flexible in the lateral direction. Each of the one or more suspension structures which suspend the first, second, third and fourth proof masses from the corresponding set of first, second, third and fourth anchor points also comprise two y-axis suspension structures on transversally opposite sides of the corresponding proof mass. Each y-axis suspension structure comprises one of said y-axis coupling elements (451, 452) and a y-axis suspension spring (471, 472) which is flexible in the transversal direction.

Capacitive force transducers may be coupled to the lateral and transversal extension elements, as described above.

Figure 7:
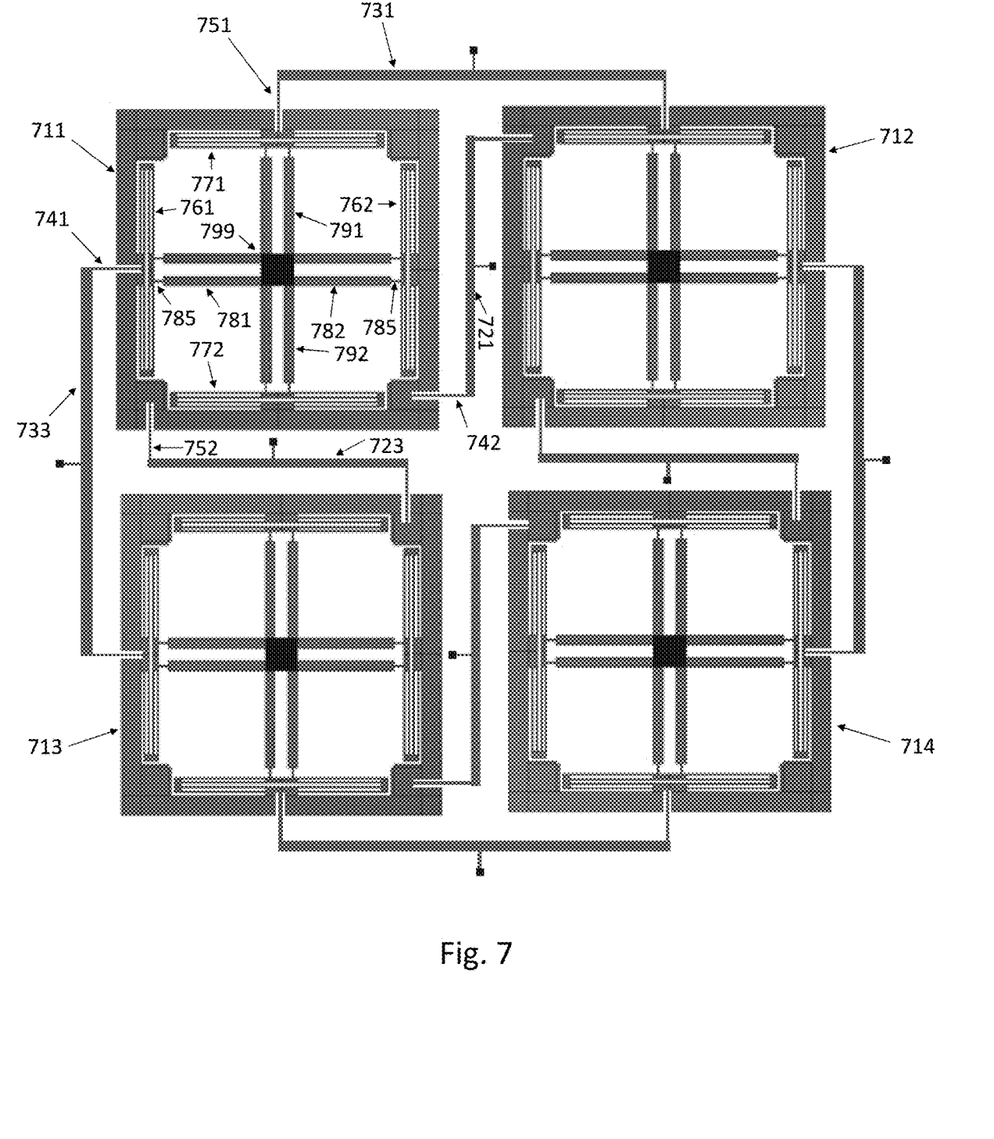
FIG. 7 illustrates a four-mass gyroscope with suspension structures within an opening in each proof mass and synchronization structures outside of the proof masses which can be driven with piezoelectric transducers.

FIG. 7 illustrates a gyroscope where reference numbers 711, 721, 723, 731 and 733 correspond to reference numbers 411, 4211, 4231, 4311 and 4331, respectively, in FIG. 4a.

In the gyroscope which is illustrated in FIG. 7 the set of first anchor points lies within a central opening in the first proof mass, the set of second anchor points lies within a central opening in the second proof mass, the set of third anchor points lies within a central opening in the third proof mass, and the set of fourth anchor points lies within a central opening in the fourth proof mass.

Each of the one or more suspension structures which suspend the first, second, third and fourth proof masses from the corresponding set of first, second, third and fourth anchor points comprise two x-axis suspension structures on laterally opposite sides of the corresponding set of anchor points. Each x-axis suspension structure comprises an x-axis suspension spring which is flexible in the lateral direction. Each of the one or more suspension structures which suspend the first, second, third and fourth proof masses from the corresponding set of first, second, third and fourth anchor points also comprise two y-axis suspension structures on transversally opposite sides of the corresponding set of anchor points. Each y-axis suspension structure comprises a y-axis suspension spring which is flexible in the transversal direction.

Each x-axis suspension structure further comprises one or more lateral bars which extend from the corresponding anchor point to the corresponding x-axis suspension spring. Each y-axis suspension structure further comprises one or more transversal bars which extend from the corresponding anchor point to the corresponding y-axis suspension spring. Each of the one or more suspension structures comprises at least one piezoelectric transducer on a lateral bar and at least one piezoelectric transducer on a transversal bar.

In FIG. 7 the set of first anchor points comprises one first anchor point 799 which lies at the center of the opening in the first proof mass 711. The suspension structure from which the first proof mass 711 is suspended comprises a first x-axis suspension structure which includes a first set of lateral bars 781 and a first laterally flexible x-axis suspension spring 761. The first set of lateral bars 781 extend from the first anchor point 799 to the first x-axis suspension spring 761 in a first lateral direction. The first x-axis suspension spring 761 extends from the first set of lateral bars 781 to the proof mass 711. The first set of lateral bars 781 may be attached to the first x-axis suspension spring 761 with transversally flexible flexures 785. The flexibility which these flexures provide at the attachment point will allow the lateral bars 781 to bend as a cantilever springs with uniform curvature along substantially the full length of the spring. The lateral bars would bend into an S-type shape if they would be clamped with a fixed attachment at both ends.

The suspension structure from which the first proof mass 711 is suspended also comprises a second x-axis suspension structure which includes a second set of lateral bars 782 and a second laterally flexible x-axis suspension spring 762. The second set of lateral bars 782 extend from the first anchor point 799 to the second x-axis suspension spring 762 in a second lateral direction, opposite to the first. The second x-axis suspension spring 762 extends from the second set of lateral bars 782 to the proof mass 711. The second set of lateral bars 782 may also be attached to the second x-axis suspension spring 762 with transversally flexible flexures 785 which perform the function described above.

The suspension structure from which the first proof mass 711 is suspended also comprises a first y-axis suspension structure which includes a first set of transversal bars 791 and a first transversally flexible y-axis suspension spring 771, and a second y-axis suspension structure which includes a second set of transversal bars 792 and a second transversally flexible y-axis suspension spring 772. The first set of transversal bars 791 extend from the first anchor point 799 to the first y-axis suspension spring 771 in a first transversal direction, while the second set of transversal bars 792 extend from the first anchor point 799 to the second y-axis suspension spring 772 in a second transversal direction, opposite to the first.

The first y-axis suspension spring 771 extends from the first set of transversal bars 791 to the proof mass 711, and the second y-axis suspension spring 772 extends from the second set of transversal bars 792 to the proof mass 711. Each of these sets of transversal bars 791-792 may be attached to the corresponding y-axis suspension spring 771-772 with a laterally flexible flexure 786. As before, the flexibility which these flexures provide at the attachment point will allow the transversal bars 791-792 to bend as a cantilever springs.

The set of first anchor points could alternatively comprise multiple first anchor points. Each lateral bar 781-782 and transversal bar 791-792 could have its own first anchor point. The number of first lateral bars 781 may for example be one, two, or greater than two. The number of second lateral bars 782 may likewise be one, two, or greater than two, The number of first transversal bars 791 may for example be one, two, or greater than two, and the number of second lateral bars 792 may likewise be one, two, or greater than two.

Piezoelectric transducers can be built on the lateral bars 781-782 and on the transversal bars 791-792. The lateral bars 781-782 are dimensioned so that they have transversal flexibility—a force generated by a transducer on these bars can bend these bars and bending generated by the movement of the proof mass can be measured by a transducer on the bar. Correspondingly, the transversal bars 791-792 are dimensioned so that they have lateral flexibility. In other words, transducers can be used to bend the suspension springs in the device plane to generate driving forces in the lateral and transversal directions, or they can be used to measure the movement of the proof mass 711 in the lateral and transversal directions.

The peripheral x-axis anti-phase structure 733 and the central x-axis anti-phase structure 721 are directly coupled to the proof mass 711 via x-axis coupling elements 741 and 742, respectively. These x-axis coupling elements extend from the respective anti-phase structure to the proof mass 711. The x-axis coupling elements 741 and 742 may in this case be elongated bars which are oriented in the lateral direction. Their (lateral) length/(transversal) width aspect ratio is great enough to give these bars flexibility in the transversal direction. On the other hand, the x-axis coupling elements 741 and 742 rigidly transmit the lateral push/pull movement of the central 721 and peripheral 733 x-axis anti-phase structures to the proof mass 711.

Correspondingly, the peripheral y-axis anti-phase structure 731 and the central y-axis anti-phase structure 731 are directly coupled to the proof mass 711 via y-axis coupling elements 751 and 752, respectively. These y-axis coupling elements extend from the respective anti-phase structure to the proof mass 711. The y-axis coupling elements 751 and 752 may be elongated bars which are oriented in the transversal direction. Their (transversal) length/(lateral) width aspect ratio is great enough to give these bars flexibility in the lateral direction. On the other hand, the y-axis coupling elements 751 and 752 rigidly transmit the transversal push/pull movement of the central 723 and peripheral 731 y-axis anti-phase structures to the proof mass 711.

Each central x-axis anti-phase structure (721) and each central y-axis anti-phase structure (723) comprises an in-plane seesaw with a central elongated bar which is suspended from at least one central anchor point with at least one central seesaw suspender which allows the central elongated bar to rotate in the device plane about an axis which is perpendicular to the device plane. Each peripheral x-axis anti-phase structure (733) and each peripheral y-axis anti-phase structure (731) also comprises an in-plane seesaw with a peripheral elongated bar which is suspended from at least one peripheral anchor point with at least one peripheral seesaw suspender which allows the peripheral elongated bar to rotate in the device plane about an axis which is perpendicular to the device plane. However, alternative peripheral anti-phase structures, which are not in-plane seesaws, could also be used.

All of these considerations on the suspension of the first proof mass 711 and on the coupling between central and peripheral anti-phase structures and proof mass 711 apply to the suspensions/coupling s of the other proof masses 712-714 as well, as can be seen in FIG. 7. The combination of transversal and lateral flexibility in each x-axis and y-axis suspension structure allows each proof mass to oscillate in the first oscillation mode independently of its oscillation in the second oscillation mode, and vice versa. The transversal flexibility of x-axis coupling elements 741 and 742 and the lateral flexibility of y-axis coupling elements 751 and 752 ensure that the first oscillation mode of each proof mass remain independent of the second oscillation mode of that proof mass even when both modes are synchronized across the oscillating four-mass system.

The invention claimed is:

1. A gyroscope which comprises a device plane where a first and a second lateral axis cross a first and a second transversal axis orthogonally, and the gyroscope also comprises first, second, third and fourth proof masses, wherein the first and second proof masses are aligned on the first lateral axis, the third and fourth proof masses are aligned on the second lateral axis, the first and third proof masses are aligned on the first transversal axis and the second and fourth proof masses are aligned on the second transversal axis, and the first and second proof masses are coupled to each other with a first central x-axis anti-phase coupling structure which flexibly allows the simultaneous movement of the first and second proof masses in opposite lateral directions but rigidly resists the simultaneous movement of the first and second proof masses in the same lateral direction, and the third and fourth proof masses are coupled to each other with a second central x-axis anti-phase coupling structure which flexibly allows the simultaneous movement of the third and fourth proof masses in opposite lateral directions but rigidly resists the simultaneous movement of the third and fourth proof masses in the same lateral direction, and the first and third proof masses are coupled to each other with a first central y-axis anti-phase coupling structure which flexibly allows the simultaneous movement of the first and third proof masses in opposite transversal directions but rigidly resists the simultaneous movement of the first and third proof masses in the same transversal direction, and the second and fourth proof masses are coupled to each other with a second central y-axis anti-phase coupling structure which flexibly allows the simultaneous movement of the second and fourth proof masses in opposite transversal directions but rigidly resists the simultaneous movement of the second and fourth proof masses in the same transversal direction, and the first and second proof masses are coupled to each other with a first peripheral y-axis anti-phase coupling structure which flexibly allows simultaneous movement of the first and second proof masses in opposite transversal directions but rigidly resists the simultaneous movement of the first and second proof masses in the same transversal direction, and the third and fourth proof masses are coupled to each other with a second peripheral y-axis anti-phase coupling structure which flexibly allows simultaneous movement of the third and fourth proof masses in opposite transversal directions but rigidly resists the simultaneous movement of the third and fourth proof masses in the same transversal direction, and the first and third proof masses are coupled to each other with a first peripheral x-axis anti-phase coupling structure which flexibly allows simultaneous movement of the first and third proof masses in opposite lateral directions but rigidly resists the simultaneous movement of the first and third proof masses in the same lateral direction, and the second and fourth proof masses are coupled to each other with a second peripheral x-axis anti-phase coupling structure which flexibly allows simultaneous movement of the second and fourth proof masses in opposite lateral directions, but rigidly resists the simultaneous movement of the second and fourth proof masses in the same lateral direction, and the gyroscope further comprises a set of first anchor points adjacent to the first proof mass, a set of second anchor points adjacent to the second proof mass, a set of third anchor points adjacent to the third proof mass and a set of fourth anchor points adjacent to the fourth proof mass, and each of the first, second, third and fourth proof masses is suspended from the corresponding set of first, second, third and fourth anchor points by one or more suspension structures, wherein each central and peripheral x-axis anti-phase coupling structure is coupled to the corresponding proof masses with an x-axis coupling element which is flexible in the transversal direction and stiff in the lateral direction, and each central and peripheral y-axis anti-phase coupling structure is coupled to the corresponding proof masses with a y-axis coupling element which is flexible in the lateral direction and stiff in the transversal direction, and wherein each central x-axis anti-phase structure and each central y-axis anti-phase structure comprises an in-plane seesaw with a central elongated bar which is suspended from at least one central anchor point with at least one central seesaw suspender which allows the central elongated bar to rotate in the device plane about an axis which is perpendicular to the device plane.

2. A gyroscope according to claim 1, wherein each peripheral x-axis anti-phase structure and each peripheral y-axis anti-phase structure comprises an in-plane seesaw with a peripheral elongated bar which is suspended from at least one peripheral anchor point with at least one peripheral seesaw suspender which allows the peripheral elongated bar to rotate in the device plane about an axis which is perpendicular to the device plane.

3. A gyroscope according to claim 1, wherein the set of first anchor points consists of four first anchor points placed symmetrically around the first proof mass, the set of second anchor points consists of four second anchor points placed symmetrically around the second proof mass, the set of third anchor points consists of four third anchor points placed symmetrically around the third proof mass, and the set of fourth anchor points consists of four fourth anchor points placed symmetrically around the fourth proof mass, and each of the one or more suspension structures which suspend the first, second, third and fourth proof masses from the corresponding set of first, second, third and fourth anchor points comprise two x-axis suspension structures on laterally opposite sides of the corresponding proof mass, and each x-axis suspension structure comprises one of said x-axis coupling elements and an x-axis suspension spring which is flexible in the lateral direction, and each of the one or more suspension structures which suspend the first, second, third and fourth proof masses from the corresponding set of first, second, third and fourth anchor points also comprise two y-axis suspension structures on transversally opposite sides of the proof mass, wherein each y-axis suspension structure comprises one of said y-axis coupling elements and a y-axis suspension spring which is flexible in the transversal direction.

4. A gyroscope according to claim 3, wherein each of the one or more suspension structures comprises at least one piezoelectric transducer on the x-axis suspension spring and at least one piezoelectric transducer on the y-axis suspension spring.

5. A gyroscope according to claim 1, wherein the set of first anchor points lies within a central opening in the first proof mass, the set of second anchor points lies within a central opening in the second proof mass, the set of third anchor points lies within a central opening in the third proof mass, and the set of fourth anchor points lies within a central opening in the fourth proof mass, and each of the one or more suspension structures which suspend the first, second, third and fourth proof masses from the corresponding set of first, second, third and fourth anchor points comprise two x-axis suspension structures on laterally opposite sides of the corresponding set of anchor points, and each x-axis suspension structure comprises an x-axis suspension spring which is flexible in the lateral direction, and each of the one or more suspension structures which suspend the first, second, third and fourth proof masses from the corresponding set of first, second, third and fourth anchor points also comprise two y-axis suspension structures on transversally opposite sides of the corresponding set of anchor points, wherein each y-axis suspension structure comprises a y-axis suspension spring which is flexible in the transversal direction, wherein each x-axis suspension structure further comprises one or more lateral bars which extend from the corresponding anchor point to the corresponding x-axis suspension spring, and each y-axis suspension structure further comprises one or more transversal bars which extend from the corresponding anchor point to the corresponding y-axis suspension spring, and each of the one or more suspension structures comprises at least one piezoelectric transducer on a lateral bar and at least one piezoelectric transducer on a transversal bar.

* * * * *